Jan. 2, 1945.  A. F. WOODWARD  2,366,584
RECEPTACLE FOR FOOD AND WATER
Filed Aug. 8, 1942
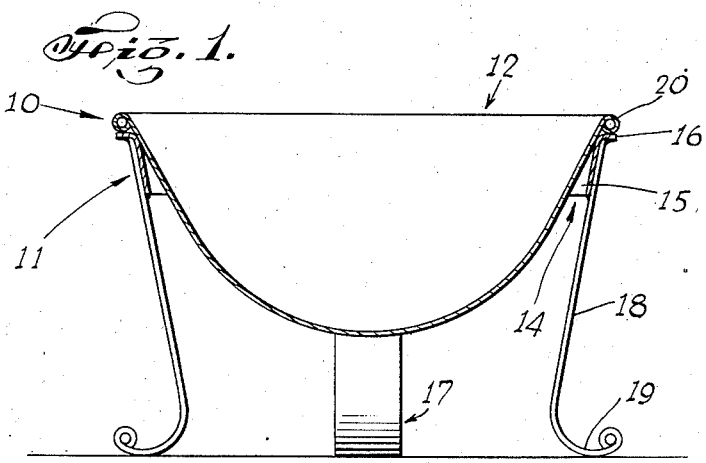
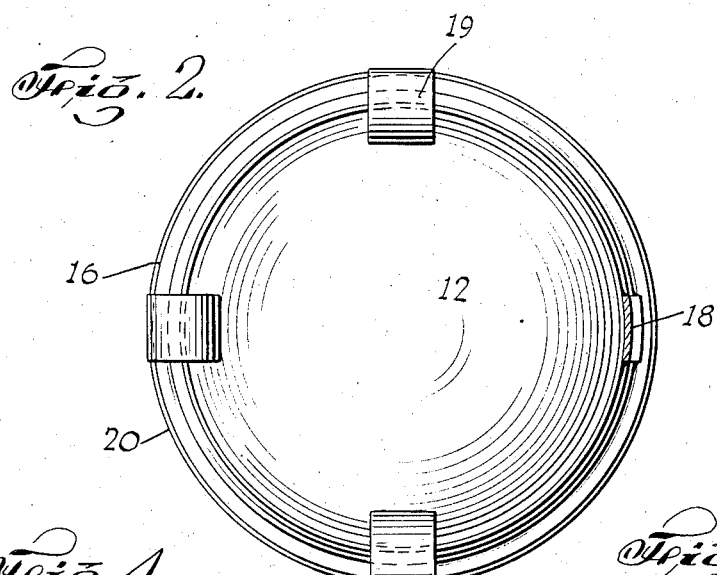
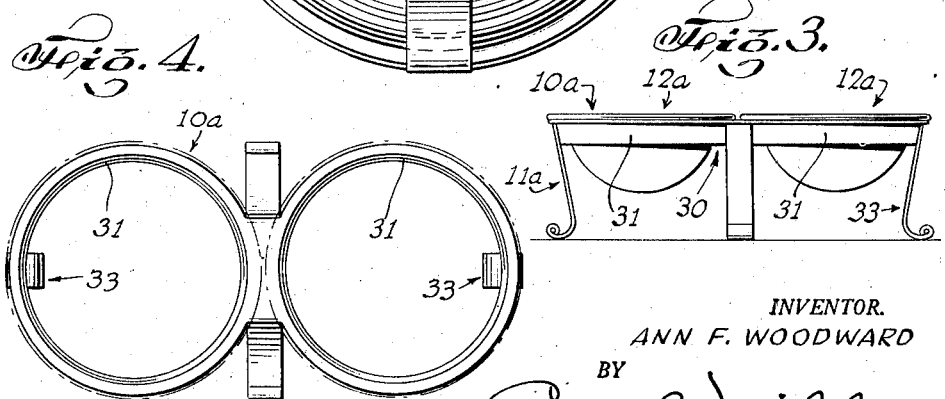
INVENTOR.
ANN F. WOODWARD
BY
Carl Miller
ATTORNEY Patented Jan. 2, 1945

2,366,584

UNITED STATES PATENT OFFICE 2,366,584

RECEPTACLE FOR FOOD AND WATER

Ann F. Woodward, Bayside, N. Y.

Application August 8, 1942, Serial No. 454,181

1 Claim. (Cl. 119—72)

This invention relates to receptacle for food and water for dogs and the like animals.

An object of this invention is to provide a receptacle for food and water for a dog or the like animal, comprising a stand and one or more dishes therein which are removable for cleaning and other purposes.

A further object of this invention is to provide a neat, strong and durable device of the character described, which shall be relatively inexpensive to manufacture, easy to manipulate and keep clean, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claim.

In the accompanying drawing, in which is shown various possible illustrative embodiments of this invention, Fig. 1 is an elevational, cross-sectional view through a receptacle for food or water for dogs, embodying the invention;

Fig. 2 is a bottom plan view thereof;

Fig. 3 is a front elevational view of a device embodying the invention, and illustrating a modified construction including two separate dishes, one for food and one for water; and Fig. 4 is a top plan view of the stand shown in Fig. 3 with the dishes removed.

Referring now in detail to the drawing, 10, designates a device of the character described for containing food or water for dogs or other animals, embodying the invention. The same comprises a stand 11 and a dish 12 removably mounted on the stand. The stand 11 comprises an annular ring 14 which may be made of sheet metal or other suitable material. The ring 14 comprises a frusto-conical portion 15 having an outwardly extending rim 16 at its upper end.

Welded, riveted or otherwise secured to the outer surface of portion 15 of said ring are a plurality of legs 17. As shown in the drawing, for the purpose of illustration only, four legs are provided, although any suitable number of legs may be employed. The legs 17 may be made of wrought iron or any other suitable material. Each comprises a portion 18 inclined downwardly and inwardly, and extending from said portion 18, is an outwardly and upwardly curved portion 19 adapted to contact the floor.

The dish 12 is preferably substantially hemispherical in shape and fits into the ring 14. At the upper end of the dish 12, is an outwardly extending rolled back rim 20 resting on top of the rim 16 of ring 14.

It will now be understood that the dish 12 may be removed for cleaning or to put food or water therein.

In Figs. 3 and 4 there is shown a device 10a embodying the invention, comprising a stand 11a supporting a pair of similar dishes 12a. The stand 11a comprises a frame 30 having two circular ring portions 31. The dishes 12a are similar to the dishes 12, and one fits into each circular ring portion 31. The frame 30 may be supported on 4 legs 33, similar to the legs 17. There may be two legs at the ends of the frame and two legs at the middle extending oppositely to one another. One dish 12a may be used for food and the other dish for water or milk.

It will be noted that the dishes 12 and 12a are spaced above the floor as clearly shown in the drawing.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

A device of the character described comprising a stand including a frame, said frame comprising a pair of annular rings in the same plane with their peripheries in adjacent and interconnected relationship, each of said rings being frusto-conical in cross-section and having an outwardly extending rim at its upper end, a pair of oppositely disposed legs secured to said frame and being in the same plane with the interconnection of said rings, and a second pair of oppositely disposed legs in a plane normal to said last mentioned plane, each of said legs being inclined downwardly and inwardly and having outwardly extending feet at its lower end, a pair of dishes removably mounted in said rings, each of said dishes having an outwardly extending annular rim engaging a ring.

ANN F. WOODWARD.